US008500194B2

(12) United States Patent
Fischer et al.

(10) Patent No.: US 8,500,194 B2
(45) Date of Patent: Aug. 6, 2013

(54) SEAT OCCUPANT DETECTION CIRCUIT ISOLATION FROM SEAT HEATING CIRCUIT USING A COMMON MODE CHOKE

(75) Inventors: Thomas Fischer, Wenden (DE); Ludger Oel, Geseke (DE); Georg Hofmann, Erlangen (DE)

(73) Assignee: Delphi Technologies, Inc., Troy, MI (US)

( * ) Notice: Subject to any disclaimer, the term of this patent is extended or adjusted under 35 U.S.C. 154(b) by 80 days.

(21) Appl. No.: 12/908,088

(22) Filed: Oct. 20, 2010

(65) Prior Publication Data

US 2011/0121618 A1   May 26, 2011

Related U.S. Application Data

(60) Provisional application No. 61/263,022, filed on Nov. 20, 2009.

(51) Int. Cl.
  *B60N 2/56* (2006.01)
  *A47C 7/72* (2006.01)

(52) U.S. Cl.
  USPC ............... 297/180.12; 297/217.3; 297/180.1; 340/667

(58) Field of Classification Search
  USPC ................... 297/180.12, 180.1, 217.2, 217.3; 324/663; 340/667
  See application file for complete search history.

(56) References Cited

U.S. PATENT DOCUMENTS

| 5,165,055 | A | * | 11/1992 | Metsler ............................ 333/12 |
| 5,914,610 | A |   | 6/1999  | Gershenfeld et al. |
| 6,043,743 | A | * | 3/2000  | Saito et al. .................... 340/562 |
| 6,140,622 | A | * | 10/2000 | Goings et al. .................. 219/506 |

(Continued)

FOREIGN PATENT DOCUMENTS

| FR | 2 841 841    | 1/2004  |
| WO | WO9513204    | 5/1995  |
| WO | 01/92900     | 12/2001 |
| WO | 2007/089654  | 8/2007  |

OTHER PUBLICATIONS

"A Method for Seat Occupancy Detection for Automobile Seats With Integrated Heating Elements", Boby George, Hubert Zangl, Thomas Bretterklieber and Georg Brasseur; XIX IMEKO World Congress, Fundamental and Applied Metrology, Sep. 6-11, 2009, Lisbon, Portugal; pp. 2113-2117.

(Continued)

*Primary Examiner* — David Dunn
*Assistant Examiner* — Erika Garrett
(74) *Attorney, Agent, or Firm* — Lawrence D. Hazelton

(57) ABSTRACT

An occupant detection system including a seat assembly comprising a seat cushion having a seating surface, a heating element adjacent the seating surface, said heating element formed of electrically conductive material, a heating circuit electrically coupled to the heating element, said heating circuit configured to supply an electrical current to the heating element effective to generate heat by the heating element, an occupant detection circuit electrically coupled to the heating element, said occupant detection circuit configured to detect an occupant presence near the heating element, and an isolation circuit interposed between the heating circuit and the heating element, said isolation circuit configured to prevent the heating circuit from influencing the occupant detection circuit, said isolation circuit comprising a common mode choke. The common mode choke is arranged so current or charge from an excitation signal for detecting an occupant that is received by the heating circuit is replaced so the excitation signal can used to accurately detect an occupant.

8 Claims, 4 Drawing Sheets

U.S. PATENT DOCUMENTS

| | | | |
|---|---|---|---|
| 6,161,070 | A | 12/2000 | Jinno et al. |
| 6,179,378 | B1 | 1/2001 | Baumgartner et al. |
| 6,369,468 | B1 * | 4/2002 | Goings et al. ............... 307/125 |
| 6,556,137 | B1 | 4/2003 | Oka et al. |
| 6,559,555 | B1 | 5/2003 | Saitou et al. |
| 6,644,689 | B2 | 11/2003 | Murphy |
| 6,696,948 | B2 | 2/2004 | Thompson et al. |
| 6,703,845 | B2 * | 3/2004 | Stanley et al. ............... 324/663 |
| 6,759,851 | B2 | 7/2004 | Hazelton |
| 6,816,077 | B1 | 11/2004 | Shieh et al. |
| 6,877,606 | B2 | 4/2005 | Hardy |
| 6,960,841 | B2 | 11/2005 | Saitou et al. |
| 6,960,918 | B2 | 11/2005 | Hazelton |
| 7,048,338 | B2 | 5/2006 | Pinkos |
| 7,084,763 | B2 | 8/2006 | Shieh et al. |
| 7,102,527 | B2 | 9/2006 | Shieh et al. |
| 7,135,983 | B2 * | 11/2006 | Filippov et al. ............... 340/667 |
| 7,151,452 | B2 | 12/2006 | Shieh |
| 7,194,346 | B2 | 3/2007 | Griffin et al. |
| 2004/0021346 | A1 | 2/2004 | Morinet et al. |
| 2004/0111201 | A1 | 6/2004 | Thompson et al. |
| 2005/0128082 | A1 | 6/2005 | Stanley et al. |
| 2005/0253712 | A1 | 11/2005 | Kimura et al. |
| 2006/0187038 | A1 | 8/2006 | Shieh et al. |
| 2008/0017625 | A1 | 1/2008 | Ito et al. |
| 2009/0267622 | A1 | 10/2009 | Hansen et al. |
| 2009/0271076 | A1 | 10/2009 | Griffin |
| 2009/0295411 | A1 | 12/2009 | Hansen et al. |
| 2009/0295412 | A1 | 12/2009 | Griffin |
| 2009/0295554 | A1 | 12/2009 | Hansen |

OTHER PUBLICATIONS

Third Party Observation for Application No. 10189883, Publication No. EP2325060; Entitled, "Seat Having Occupant Detection Circuit Isolation From Seat Heating Circuit Using a Common Mode Choke", 8 pages.

European Search Report dated Feb. 27, 2012.

* cited by examiner

US 8,500,194 B2

SEAT OCCUPANT DETECTION CIRCUIT ISOLATION FROM SEAT HEATING CIRCUIT USING A COMMON MODE CHOKE

CROSS-REFERENCE TO RELATED APPLICATION

This application claims the benefit under 35 U.S.C. §119 (e) of U.S. Provisional Patent Application No. 61/236,022, filed Nov. 20, 2009, the entire disclosure of which is hereby incorporated herein by reference.

TECHNICAL FIELD OF INVENTION

The invention relates to seat assemblies having occupant detection. More particularly, this invention relates to seat assemblies using seat heating elements for both seat heating and occupant detection wherein the occupant detection circuit is electrically isolated from the seat heating circuit during occupant sensing.

BACKGROUND OF INVENTION

Occupant detection systems using a heating element for both seat heating and occupant detection are known. These systems operate by periodically disconnecting a heating current source from the heating element so the occupant detection circuit can use the heating element as an occupant sensor. A more detailed description of occupant detection systems can be found in U.S. patent application Ser. No. 12/433,923 filed by Kincaid et al on May 1, 2009, the entire disclosure of which is hereby incorporated herein by reference. The occupant detection circuit outputs an excitation signal to generate an electric field about the heating element. The presence of an object or occupant near the heating element influences the electric field and so influences an electric impedance of the heating element as measured by the occupant detection circuit. The heating control circuit used to disconnect the heating current source from the heating element must isolate the heating current source from the heating element to prevent interference with the occupant detection circuit. If the heating control circuit influences the electric field impedance, the accuracy and reliability of occupant detection is reduced.

It has been proposed to use transistors for connecting and disconnecting heating current to and from the heating element. When the transistors are off the heating current is disconnected. However, the transistors have open-switch impedance that remains coupled to the heating element. Thus, the heating element is not isolated from the heating current source and the accuracy of the occupant detection circuit measurement is affected. It has also been proposed that the effect of the transistor open-switch impedance on the occupant detection circuit can be reduced by adding diodes in series with the transistors and biasing the diodes to reduce diode junction capacitance. However, the diodes increase circuit complexity and do not isolate the open-switch impedance because the circuit does not eliminate diode junction capacitance. Thus, adding diodes does not isolate the heating circuit source from the occupant detection circuit. It has also been proposed to use mechanical relays for connecting and disconnecting heating current to and from the heating element. Unfortunately, the relay contacts and their interconnecting wires still remain connected to the heating element even when the relays are opened, thereby adding open-switch impedance to the measurement made by the occupant detection circuit, and reducing the accuracy of the measurement.

SUMMARY OF THE INVENTION

In general, the invention uses a common mode choke to isolate a heating circuit from an occupant detection circuit.

In accordance with an embodiment of this invention, an occupant detection system is provided. The occupant detection system includes a seat assembly, a heating element, a heating circuit, and an occupant detection circuit. The seat assembly includes a seat cushion having a seating surface. The heating element is adjacent the seating surface and is formed of electrically conductive material. The heating circuit is electrically coupled to the heating element and is configured to supply an electrical current to the heating element that is effective to generate heat by the heating element. The occupant detection circuit is electrically coupled to the heating element. The occupant detection circuit is configured to detect an occupant presence near the heating element. The isolation circuit is interposed between the heating circuit and the heating element and is configured to prevent the heating circuit from influencing the occupant detection circuit. The isolation circuit includes a common mode choke.

In accordance with an embodiment of this invention, an occupant detection system controller is provided. The controller is electrically coupled to a heating element formed of electrically conductive material that is located adjacent a seating surface of a seat assembly. The controller includes an occupant detection circuit and an isolation circuit. The occupant detection circuit is electrically coupled to the heating element and is configured to detect an occupant presence near the heating element. The isolation circuit is interposed between the heating circuit and the heating element and is configured to prevent the heating circuit from influencing the occupant detection circuit. The isolation circuit includes a common mode choke.

In accordance with one embodiment of this invention, an occupant detection system is provided. The occupant detection system includes a seat, a heating element, a heating circuit, and an occupant detection circuit. The seat assembly includes a seat cushion having a seating surface. The heating element is adjacent the seating surface, and is formed of electrically conductive material. The heating circuit is electrically coupled to the heating element, and is configured to supply an electrical current to the heating element effective to generate heat by the heating element. The occupant detection circuit is electrically coupled to the heating element, and is configured to detect an occupant presence near the heating element. The isolation circuit is interposed between the heating circuit and the heating element, and is configured to prevent the heating circuit from influencing the occupant detection circuit. The isolation circuit includes a common mode choke.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
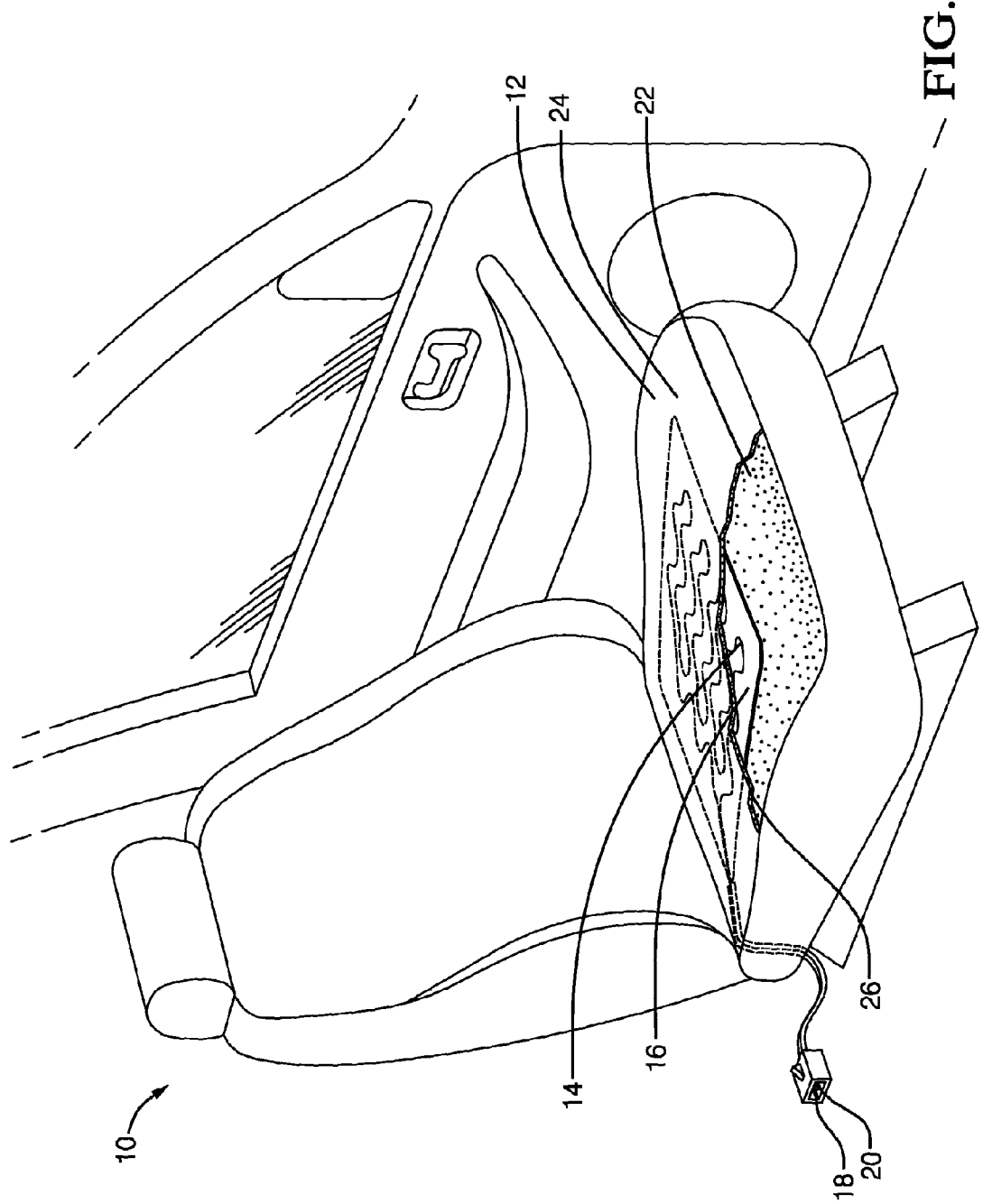
FIG. 1 is a perspective view of a seat assembly.
Figure 2:
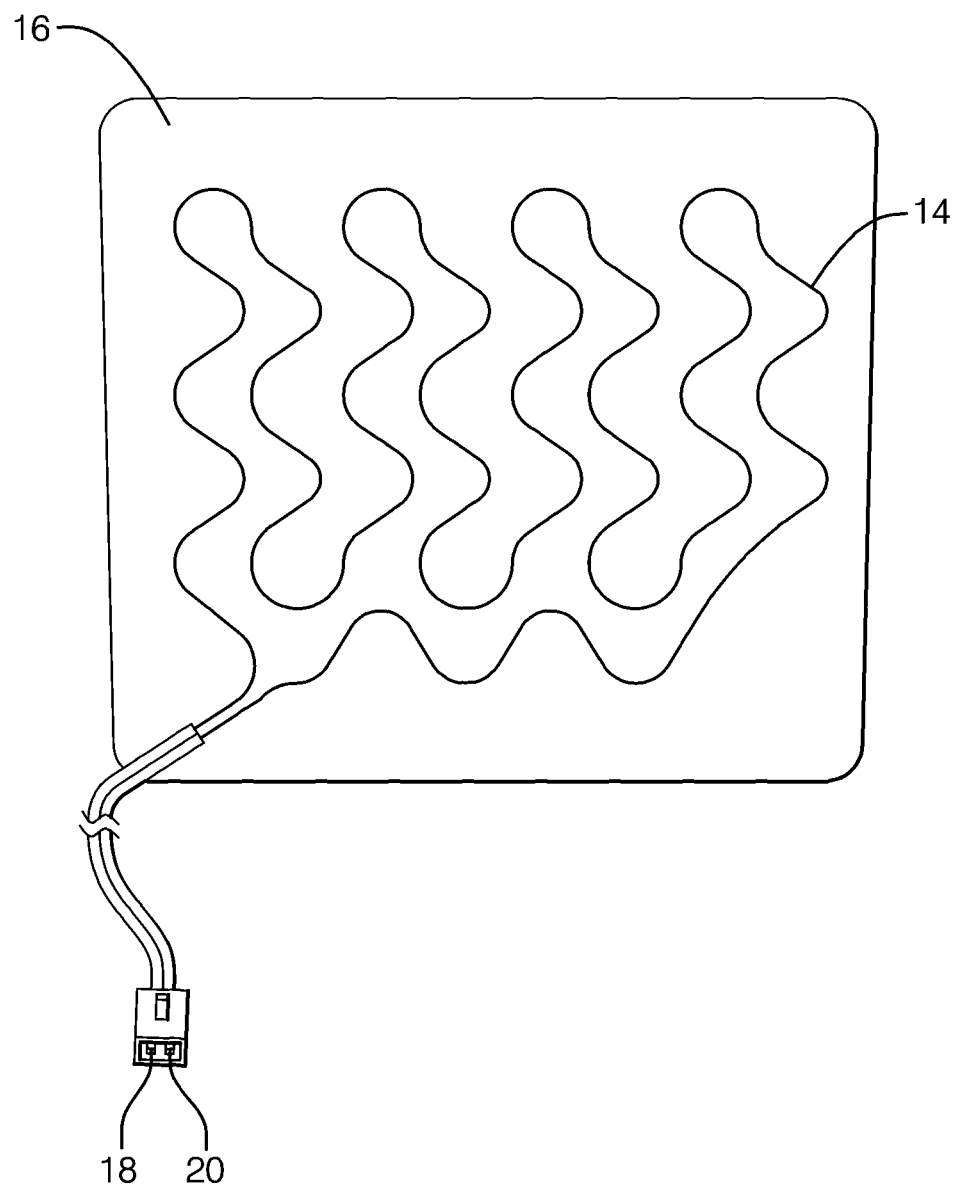
FIG. 2 is a top view of a mat.

In accordance with an embodiment of seat assembly, FIG. 1 shows seat assembly 10 in a vehicle passenger compartment having seat cushion 12 providing seating surface 24 for supporting an occupant (not shown). Within seat cushion 12 is cushion 22 typically made of foam and determining the size and shape of seat cushion 12. Adjacent seating surface 24 is mat 16 having heating element 14 attached to mat 16. Mat 16 with heating element 14 is shown in more detail in FIG. 2. The heating element can be made of any electrically conductive material capable of surviving the stress and strain of being adjacent a seating surface and providing sufficient resistance to electrical current to generate a quantity of heat effective to warm the seating surface. Exemplary forms of heating elements include metal wire, conductive fiber, metal foil, and metal ribbon. Cushion 22 is covered with covering 26 to protect the foam forming cushion 22, protect heating element 14, and to make the appearance of seat assembly 10 attractive. Mat 16 is depicted in FIG. 1 arranged between cushion 22 and covering 26, thereby making a simple to manufacture seat assembly. Positioning heating element 14 near seating surface 24 promotes heat transmission from heating element 14 through the covering and to the seating surface, thereby improving occupant comfort when seat heating is desired. The positioning of the heating element near the seating surface also improves occupant detection sensitivity and accuracy of detecting an occupant near seating surface 24 by maximizing the electrical field coupling to the occupant. The ends of heating element 14 are terminated with a first terminal 18 and second terminal 20, so are readily connected to the rest of the occupant detection/seat heating system.

Figure 3:
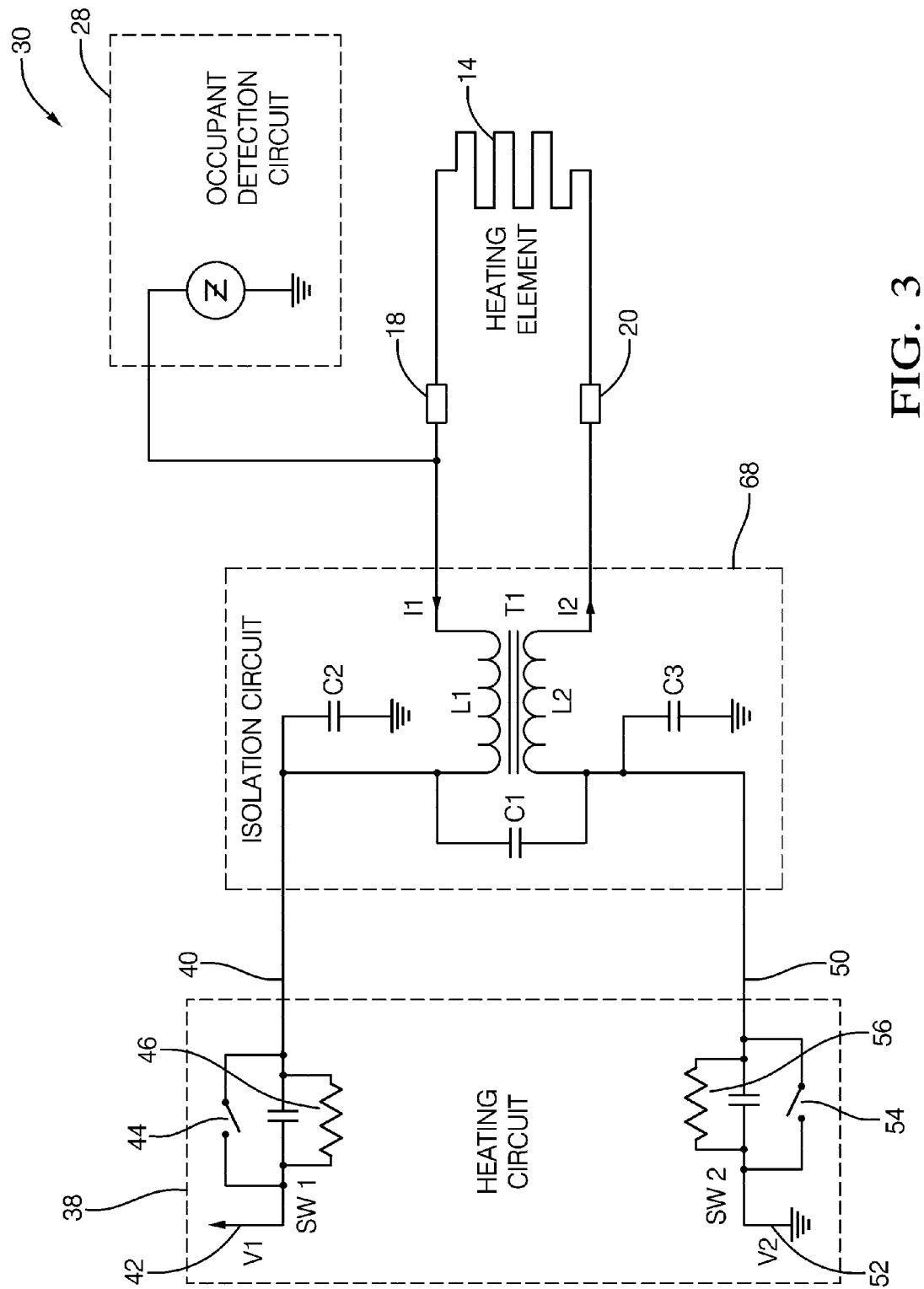
FIG. 3 is a block diagram of an occupant detection/seat heating system.

FIG. 3 is a block diagram showing the interconnections of a heating element 14, an occupant detection circuit 28, a heating circuit 38, and an isolation circuit 68 interposed between heating circuit 38 and heating element 14. In one embodiment the combination of occupant detection circuit 28, and isolation circuit 68 may form a controller 30. In this embodiment, the heating circuit 38 may be in another location, away from the controller 30. In another embodiment the combination of occupant detection circuit 28, heating circuit 38, and isolation circuit 68 may form a controller 30. The controller 30 may include a processor such as a microprocessor or other control circuitry as should be evident to those in the art. The controller 30 may include memory, including non-volatile memory, such as electrically erasable programmable read-only memory (EEPROM) for storing one or more routines, thresholds and captured data. During the heating mode, the heating circuit applies a heating voltage V1-V2, a source of heating current, to the heating element by closing a heater switch comprising first heater switch 44 and second heater switch 54. Steady current flows through a first inductor L1 and a second inductor L2, where L1 and L2 are inductively coupled as illustrated by L1 and L2 forming a common mode choke T1. During the periodic occupant sensing mode, switches 44 and 54 may open to disconnect the heating voltage during occupant detection, however it is not necessary to disconnect the heating voltage during occupant detection.

During occupant detection, the field impedance of heating element 14 may be measured by occupant detection circuit 28 to detect the proximity of an object or occupant near the seating surface 24. The occupant detection circuit 28 uses the heating element 14 like an antenna and measures electric impedance of the heating element to detect the presence of an object or occupant near the seat assembly seating surface. The electric impedance can be modeled as predominantly capacitive in nature, but can also exhibit a resistive characteristic in parallel and/or in series with the model capacitor. When the heater switch is open and heating current is disconnected, the switches still have open-switch impedances that would couple the heating element to the heating voltage if not for isolation circuit 68. For the occupant detection circuit measurement to be accurate, it is necessary to isolate the heating voltage V1-V2 and/or the open-switch impedance of the heating circuit 38 from the electric impedance of the heating element 14, thereby preventing the open-switch impedance and/or the heater circuit from affecting the electric impedance measurement. Then, while the occupant detection circuit is measuring impedance, only the field impedance is present in the measurement. If the heating voltage and/or the open-switch impedance are not isolated, the heating circuit impedance will combine with electric impedance of the heating element and influence the accuracy of the impedance measurement, thereby reducing the confidence of determining the presence of an object or occupant. Even if the heater switches 44 and 54 are closed, the isolation circuit 68 effectively prevents the alternating current excitation signal from the occupant detecting circuit 28 from dissipating into the heater circuit which may influence the impedance measured by the occupant detection circuit 28.

Figure 4:
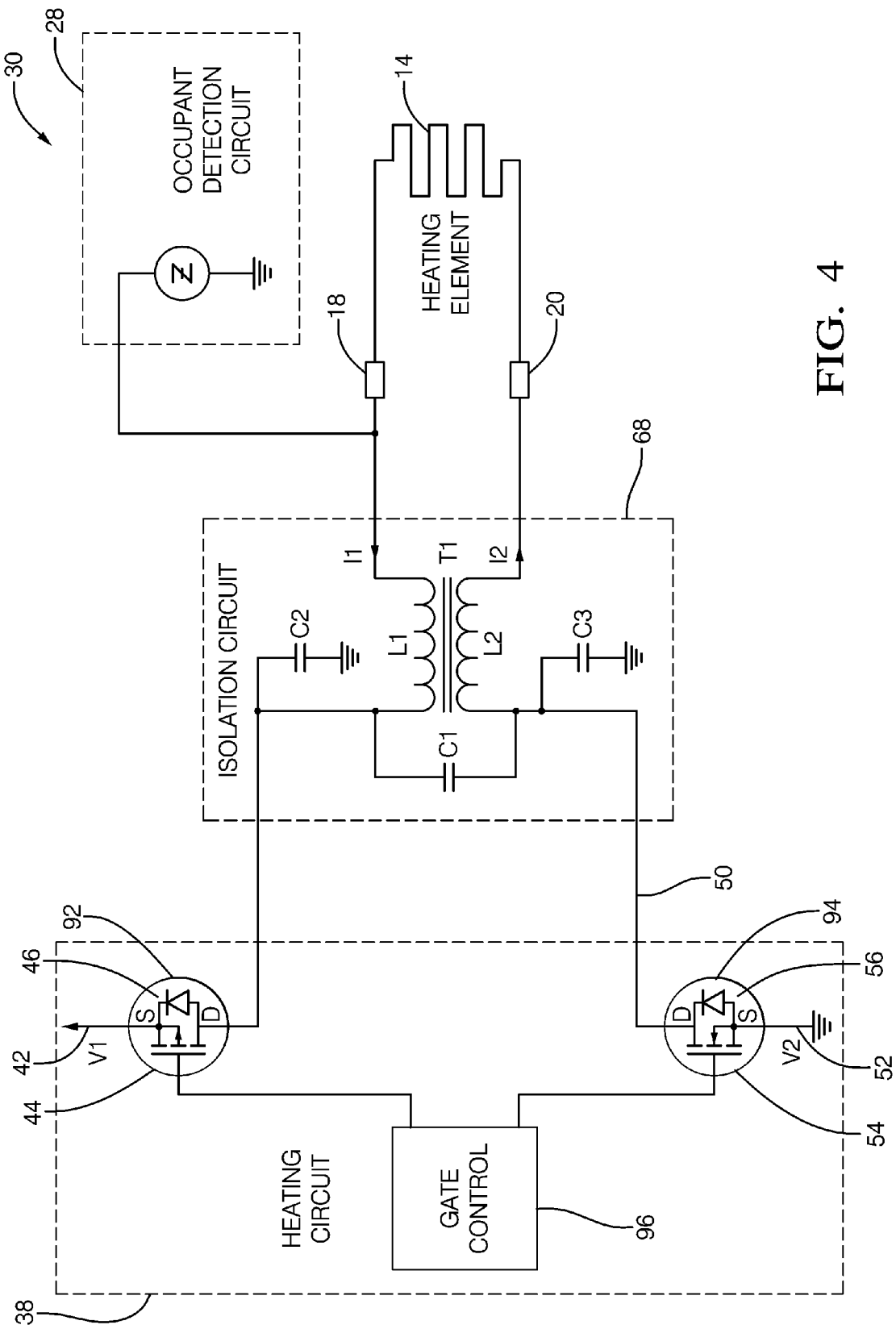
FIG. 4 is a schematic diagram of an occupant detection/seat heating system.

As illustrated in FIGS. 3 and 4, the isolation circuit 68 is interposed between the heating circuit 38 and the heating element 14. The isolation circuit 68 is configured to prevent the heating circuit 38 from influencing the occupant detection circuit 28. As used herein, influencing the occupant detection circuit 28 means that the electrical load or impedance of the heating circuit 38 does not combine with the electric impedance of the heating element 14 in a way that would influence the detection of an occupant by the occupant detection circuit 28 by, for example, changing the apparent electric impedance of the heating element 14 measured by the occupant detection circuit 28. By way of a non-limiting example, if the excitation signal output by occupant detection circuit 28 is a sinusoidal signal, and the isolation circuit 68 includes comprising a common mode choke T1 as shown, then depending on the electrical characteristics of the common mode choke T1 and the frequency of the excitation signal, at least a portion of the sinusoidal excitation signal is prevented from dissipating into the heating circuit 38. By this arrangement, the occupant detection circuit 28 detects an occupant by analyzing an excitation signal output by the occupant detection circuit 28, and the isolation circuit prevents 68 the heating circuit from influencing the occupant detection circuit by preventing the excitation signal from being influenced by the heating circuit. While not subscribing to any particular theory, the polarity of the common mode choke T1 indicated by the dots next to the common mode choke T1 is arranged to induce a second current I2 toward the heater element in response to a first current I1 away from the heater element. By such an arrangement the electric charge leaving the heating element 14 through one coil of the common mode choke, L1 for example, will be replaced at least in part by charge from a current induced in the other coil L2.

FIGS. 3 and 4 illustrate the heating circuit 38 as having two switches, commonly called a high side switch and a low side switch. It is advantageous to provide both high and low side switches to facilitate fault detection, for example, as seen by reference to U.S. Pat. No. 6,759,851 entitled "METHOD AND APPARATUS FOR CONTROL AND FAULT DETECTION OF AN ELECTRIC LOAD CIRCUIT" issued Jul. 6, 2004 to Hazelton and U.S. Pat. No. 6,960,918 entitled "METHOD AND APPARATUS FOR CONTROL AND FAULT DETECTION OF A REMOTE ELECTRIC MOTOR" issued Nov. 1, 2005 to Hazelton, both owned by the common assignee of the present invention and hereby incorporated by reference herein in its entirety. However, in an alternate embodiment the heating circuit 38 may have only a high side switch or a low side switch. For example, SW2 in FIG. 3 or MOSFET 94 in FIG. 4 may be replaced with a short circuit between L2 and V2. Such an arrangement is advantageous in that is saves the expense of providing two switches, however some the fault detection capabilities will be lost as will be apparent on review of the references cited above. It should be appreciated that the option to replace one of the switches, or both of the switches of control of heating current is not desired, is possible because of the isolation provided by the common mode choke T1. It should also be appreciated that one or both of the MOSFETs could be replaced with electromechanical relays.

In one embodiment of seat assembly 10 with occupant detection circuit 28 and heating circuit 38 described herein, the system alternates between the seat heating mode and occupant sensing mode at an exemplary frequency of about 1 Hz, using about 900 ms of the frequency period for seat heating and about 100 ms of the frequency period for occupant detection. During seat heating, a heating voltage is connected to heating element 14 so electrical heating current is supplied to the heating element, thereby heating seating surface 24. In an automobile, a typical heating voltage is 12 to 14V and a typical heating current is around 8 A. During occupant detection, heating voltage V1 and V2 are disconnected so the electrical load presented by the heating voltage is reduced and so less likely to impair the occupant detection circuit's use of the heating element as an occupant sensor.

The capacitive portion of the field impedance for an exemplary empty seat assembly shown in FIG. 1 is typically 50 pF to 100 pF. When an occupant is present, the capacitive portion will increase by an amount dependent upon the size of the occupant, position of the occupant relative to the heating element, and the occupants clothing. Typical increases in the capacitive portion due to an occupant range from 30 pF to 80 pF. In view of these typical values, the field impedance measured by occupant detection circuit 28 will be noticeably influenced by the heating circuit having first open-switch impedance 46 and/or a second open switch impedance 56 totaling of a few pico-Farads. An exemplary design guideline would be to limit the field impedance measurement error caused by the heating circuit to less than 5 pF. Thus, the sensitivity of the occupant detection circuit to any open-switch impedance makes it necessary to isolate the open-switch impedance, thereby eliminating any additional impedance due to the heating circuit being coupled with the heating element when occupant sensing is being performed. Some occupant detection circuits operate by generating an oscillating signal, typically sinusoidal in nature having a frequency of about 10 kHz to 1000 kHz. The signal passes through an electrical component having a known reference impedance and the output from the reference impedance is applied to an unknown impedance, in this case the electric field impedance of the occupant sensing element. By comparing the signal on opposite sides of the reference impedance, the value of the unknown impedance can be determined.

Isolation of the open-switch impedance is provided for by isolation circuit 68 as shown in FIG. 3. The isolation circuit isolates the heating circuit 38 from the occupant detection circuit 28 by preventing or blocking current from the occupant detection circuit from passing through the heating circuit. As described before, the electric impedance of the heating element 14 can be modeled as a capacitor where one end of the capacitor is connected to terminal 18 and the other end is connected to ground. The coupling polarity of L1 and L2 is such that current from the occupant detection circuit passing through L1 of T1 would induce a complementary current in L2 that would act to replace charge passing through L1. The effect is, as far as the occupant detection circuit is concerned, the currents through L1 and L2 are offsetting and thereby cancel each so the error due to current from the occupant detection circuit passing through L1 is minimized. If occupant detection is only performed when the heater switches 44, 54 are open or off, a suitable value for L1 and L2 is about 1 mH. If occupant detection is to be performed when the heater switches 44, 54 are closed or on, a larger value of inductor will be necessary to compensate for the lower impedance presented by the heating circuit.

In another embodiment, the isolation circuit also includes capacitors C1, C2, and C3 as shown. The capacitors improve the alternating current coupling to ground, thereby improving the effectiveness of common mode choke T1 to offset occupant detection circuit current errors.

An exemplary embodiment is shown in FIG. 4 has P-channel MOSFET 92 being used as a first heater switch 44 for connecting to and disconnecting from a first voltage 42. It is known that transistors have capacitive and resistive characteristics coupling the drain to the source when in the OFF state. A suitable P-channel MOSFET 92 for controlling electric current supplied to seat heater 14 is an International Rectifier IRF7424. As depicted in FIG. 3, first open-switch impedance 46 equivalent capacitance can be approximated by using the typical output capacitance ($C_{oss}$) of 580 pF listed in the transistor's data sheet. A similar value of capacitance would be present in a complementary N-channel MOSFET 94 used for controlling the connection to second voltage 52. In view of these values for characterizing the open switch impedance, it is readily apparent that the open-switch impedances need to be isolated from the field impedance, thereby completely eliminating any effect on the field impedance measured by occupant detection circuit 28. It should also be noted that the parasitic characteristics of the transistors vary with applied voltage, temperature, manufacturing lot, etc., so simply adjusting the field impedance readings with a predetermined adjustment is not a practical alternative.

The states of the four transistors shown in FIG. 4 are controlled by a gate control 96. Heater switch 44 and 54 are biased to the ON state to supply heating current and biased to the OFF state during occupant sensing. Another feature of the exemplary embodiment in FIG. 4 is the use of a coupling capacitor 32 across first terminal 18 and second terminal 20. Coupling capacitor 32 improves the performance of the occupant detection circuit by bypassing some of the resistive and inductive characteristic of heating element 14.

Thus, a seat assembly having seat heating circuit and occupant detection circuit using a heating element for both seat heating and occupant sensing, and isolating the heating circuit from the occupant detection circuit is provided. The seat assembly uses transistors for switching heater current, and isolates the open-switch impedance of the switch transistors from the occupant detection circuit, thereby preventing the heating circuit impedance from affecting the accuracy of the occupant detection circuit.

While this invention has been described in terms of the preferred embodiments thereof, it is not intended to be so limited, but rather only to the extent set forth in the claims that follow. For example, it is to be appreciated that different kinds of transistors and devices other than transistors could provide adequate performance and different advantages.

We claim:

1. An occupant detection system, comprising:
a seat assembly comprising a seat cushion having a seating surface;
a heating element adjacent the seating surface, said heating element formed of electrically conductive material;
a heating circuit electrically coupled to the heating element, said heating circuit configured to supply an electrical current to the heating element effective to generate heat by the heating element;
an occupant detection circuit electrically coupled to the heating element, said occupant detection circuit configured to detect an occupant presence near the heating element; and
an isolation circuit interposed between the heating circuit and the heating element, said isolation circuit configured to prevent the heating circuit from influencing the occupant detection circuit, said isolation circuit comprising a common mode choke, wherein the common mode choke comprises a first inductor inductively coupled to a second inductor such that current in the first in inductor induces current in the second inductor, wherein the common mode choke is characterized as a four terminal device.

2. The system in accordance with claim 1, wherein the occupant detection circuit detects an occupant by analyzing an excitation signal output by the occupant detection circuit, and the isolation circuit prevents the heating circuit from influencing the occupant detection circuit by preventing the excitation signal from being influenced by the heating circuit.

3. The system in accordance with claim 1, wherein the common mode choke is configured to induce a second current toward the heater element in response to a first current away from the heater element.

4. An occupant detection system controller electrically coupled to a heating element formed of electrically conductive material and located adjacent a seating surface of a seat assembly, said controller comprising:
an occupant detection circuit electrically coupled to the heating element, said occupant detection circuit configured to detect an occupant presence near the heating element; and
an isolation circuit interposed between a heating circuit and the heating element, said isolation circuit configured to prevent the heating circuit from influencing the occupant detection circuit, said isolation circuit comprising a common mode choke, wherein the common mode choke comprises a first inductor inductively coupled to a second inductor such that current in the first in inductor induces current in the second inductor, wherein the common mode choke is characterized as a four terminal device.

5. The controller in accordance with claim 4, wherein the controller further comprises a heating circuit electrically coupled to the heating element, said heating circuit configured to supply an electrical current to the heating element effective to generate heat by the heating element.

6. The controller in accordance with claim 5, wherein the occupant detection circuit detects an occupant by analyzing an excitation signal output by the occupant detection circuit, and the isolation circuit prevents the heating circuit from influencing the occupant detection circuit by preventing the excitation signal from being influenced by the heating circuit.

7. The controller in accordance with claim 6, wherein the common mode choke is configured to induce a second current toward the heater element in response to a first current away from the heater element.

8. A seat assembly, comprising:
a seat cushion having a seating surface;
a heating element adjacent the seating surface formed of electrically conductive material;
a heating circuit coupled to the heating element for supplying an electrical current to the heating element effective for generating heat;
an occupant sensing circuit coupled to the heating element and effective for sensing the presence of an occupant near the heating element; and
an isolation circuit interposed between the heating circuit and the heating element, said isolation circuit including a common mode choke arranged to induce a second current in response to a first current for isolating the heating circuit from the isolation circuit, wherein the common mode choke comprises a first inductor inductively coupled to a second inductor such that current in the first in inductor induces current in the second inductor, wherein the common mode choke is characterized as a four terminal device.

* * * * *